UNITED STATES PATENT OFFICE.

A. D. DITMARS, OF CHESTER COUNTY, PENNSYLVANIA.

MODE OF PRESERVING HAY, &c.

Specification forming part of Letters Patent No. 599, dated February 15, 1838.

*To all whom it may concern:*

Be it known that I, A. D. DITMARS, formerly of Queens county, in the State of New York, now in Chester county, in the State of Pennsylvania, have invented or discovered a new and Improved Method of Preserving Grass for Hay; and I do hereby declare that the following is a full and exact description.

The nature of my invention or discovery consists simply in excluding the grass from the air or the air from the grass. The manner in which it is done is simply this: The grass is cut when it is not wet with either dew or rain and packed immediately in rooms or "banters" prepared for it. The banters are prepared in the following manner: If it be a frame barn, three sides of the banter are ready for the sheet-lead without any further preparation. The other three are prepared by putting a floor in the bottom, a board partition at the side, and a lid on the top, to be raised up and down, as may be necessary, with a rope over a wheel or pulley. The sheet-lead is then put on, so as to exclude the air, by lapping the sheets and uniting them where they lap with a hot iron. The whole inside of the banter or room is thus covered with sheet-lead and painted to prevent the lead from oxidizing. On the four sides of the banter or room the sheet-lead is fastened up by nailing it at the top to the boards. The sheet-lead extends two or three inches above the lid on the sides, and the sheets that cover the under side of the lid extend over on the top of the lid three or four inches all around the lid. The only place through which the air can now pass is between the edges of the lid and the sides of the banter, which is prevented by a strip of sheet-lead laid around over the crack and united with a hot iron to the lead on the sides of the banter and the lead on the top of the lid, the lead on the sides of the banter extending above the lid. It is now as airtight as lead can make it. If the barn be a stone barn, the three sides of the banter are prepared for the sheet-lead by plastering them and putting a piece of board at the top to nail the sheets of lead to. The other three sides are prepared in the manner before described; or a superstructure can be reared in the field where the grass grows, and lined with sheet-lead in the manner described, the lid serving the purpose of roof with a vent on one side to carry the water off the building, being raised a little on one side for the purpose. When the place is thus prepared the grass being neither wet with rain nor dew is cut down and packed in. When packed full the lid is let down and fastened up in the manner before described, and thus kept till the weather has become cold, till winter has set in, then opened and used, fed out as hay commonly is. It is only calculated for the cold season of the year and the cold climes of the world. As far as it reaches it is attended with the following advantages: It avoids the loss of hay by showers and rains. It avoids the anxiety of mind and mental anguish that farmers feel with large crops of hay thus exposed. It saves the expense of drying it in the sun, which is heavy. It avoids the loss of substance that attends drying it in the sun, which is between two-thirds and three-fourths of the whole amount. Red clover in drying to hay loses more than three-fourths of its substance; timothy more than two-thirds. By this process not a particle of substance is lost. That much of the substance is lost must be evident to everybody, because the animal that will fatten upon the grass will get poor upon the hay made of that grass.

What I claim as my invention or discovery, and desire to secure by Letters Patent, is—

The preservation of grass for hay by excluding it from the air with sheet-lead.

A. D. DITMARS.

Witnesses:
MIFFLIN LEWIS,
JOHN B. IVESTER.